(12) United States Patent
Kuter-Arnebeck

(10) Patent No.: US 12,289,542 B2
(45) Date of Patent: Apr. 29, 2025

(54) SYSTEMS, DEVICES, AND METHODS FOR USER SELECTABLE TEMPERATURE SCALE BANDWIDTH FOR THERMOGRAPHY

(71) Applicant: Snap-on Incorporated, Kenosha, WI (US)

(72) Inventor: Ottoleo Kuter-Arnebeck, Kenosha, WI (US)

(73) Assignee: Snap-on Incorporated, Kenosha, WI (US)

( * ) Notice: Subject to any disclaimer, the term of this patent is extended or adjusted under 35 U.S.C. 154(b) by 88 days.

(21) Appl. No.: 17/946,029

(22) Filed: Sep. 15, 2022

(65) Prior Publication Data

US 2024/0098378 A1   Mar. 21, 2024

(51) Int. Cl.
*H01L 29/94* (2006.01)
*G06T 5/50* (2006.01)
(Continued)

(52) U.S. Cl.
CPC .............. *H04N 25/21* (2023.01); *G06T 5/50* (2013.01); *G06T 5/90* (2024.01); *G06T 11/001* (2013.01)

(58) Field of Classification Search
CPC .. H04N 25/21; G06T 5/50; G06T 5/90; G06T 11/001
See application file for complete search history.

(56) References Cited

U.S. PATENT DOCUMENTS 7,544,944 B2   6/2009   Strandemar et al.
7,622,716 B2   11/2009  King
(Continued)

FOREIGN PATENT DOCUMENTS

CN   107403407    11/2017
WO   2021232587   11/2021

OTHER PUBLICATIONS

Flir, "IR Automation Guidebook: Temperature Monitoring and Control with IR Cameras", https://www.flirmedia.com/MMC/THG/Brochures/T559213/T559213_EN.pdf, Jun. 16, 2022.
(Continued)

*Primary Examiner* — Joseph Suh
(74) *Attorney, Agent, or Firm* — McDonnell Boehnen Hulbert & Berghoff LLP

(57) ABSTRACT

A computer-implemented method for displaying thermal images by a thermal imager device is provided. The method includes displaying, by a user interface of a computing device, a plurality of thermal images corresponding to a respective plurality of objects in a scene captured by the thermal imager device. The plurality of thermal images are displayed by a first representation scheme based on a first thermal scale comprising a first range of temperature values corresponding to the plurality of objects. The method includes receiving, by the computing device, a user selection of a subplurality of the plurality of thermal images. And the method includes, responsive to the user selection, displaying, by the user interface, the subplurality of the plurality of thermal images by a second representation scheme based on a second thermal scale comprising a second range of temperature values corresponding to a respective subplurality of the plurality of objects.

20 Claims, 10 Drawing Sheets

(51) Int. Cl.
  *G06T 5/90* (2024.01)
  *G06T 11/00* (2006.01)
  *H04N 25/21* (2023.01)

(56) References Cited

U.S. PATENT DOCUMENTS

| | | | |
|---|---|---|---|
| 7,693,679 | B1 | 4/2010 | Warnke et al. |
| 7,940,994 | B2 | 5/2011 | Aguilar |
| 7,994,480 | B2 | 8/2011 | Johnson et al. |
| 8,010,311 | B1 | 8/2011 | Warnke et al. |
| 8,354,639 | B2 | 1/2013 | Joensson et al. |
| 8,386,951 | B2 | 2/2013 | Tallman |
| 8,483,990 | B2 | 7/2013 | Warnke et al. |
| 8,911,147 | B2 | 12/2014 | Warnke et al. |
| 9,109,945 | B1 | 8/2015 | Warnke et al. |
| 9,251,615 | B2 | 2/2016 | Schmidt et al. |
| 9,436,367 | B2 | 9/2016 | Andersson |
| 9,693,693 | B2 | 7/2017 | Farag et al. |
| 9,878,804 | B2 | 1/2018 | Olsen |
| 9,891,817 | B2 | 2/2018 | Andersson |
| 9,900,524 | B2 | 2/2018 | Lammert et al. |
| 10,089,787 | B2 | 10/2018 | Bjorn |
| 10,230,907 | B2 | 3/2019 | Wang |
| 10,230,908 | B2 | 3/2019 | Wang |
| 10,298,859 | B2 | 5/2019 | Frost et al. |
| 10,362,242 | B2 | 7/2019 | Henry |
| 10,447,946 | B2 | 10/2019 | Pinter |
| 10,506,193 | B2 | 12/2019 | Ruther et al. |
| 10,547,820 | B2 | 1/2020 | Henry |
| 10,684,173 | B2 | 6/2020 | Pinter |
| 10,848,725 | B2 | 11/2020 | Chahine et al. |
| 10,909,835 | B1 | 2/2021 | Singh et al. |
| 11,017,515 | B2 | 5/2021 | Hu |
| 11,035,736 | B2 | 6/2021 | Aoki et al. |
| 11,070,763 | B2 | 7/2021 | Hoevenaar et al. |
| 11,354,827 | B2 | 6/2022 | Wei et al. |
| 2001/0054989 | A1* | 12/2001 | Zavracky ............ G02B 27/017 |
| | | | 345/8 |
| 2003/0108099 | A1* | 6/2003 | Nagumo ................ G06T 9/20 |
| | | | 375/E7.199 |
| 2007/0098396 | A1* | 5/2007 | Watanabe ............ H04N 23/61 |
| | | | 396/374 |
| 2008/0019572 | A1 | 1/2008 | McManus et al. |
| 2009/0023472 | A1* | 1/2009 | Yoo ...................... H04M 1/576 |
| | | | 455/415 |
| 2010/0303068 | A1* | 12/2010 | Glaros ............... H04L 12/4633 |
| | | | 370/389 |
| 2015/0030987 | A1* | 1/2015 | Pathangay ............. F23G 7/085 |
| | | | 431/13 |
| 2018/0054573 | A1 | 2/2018 | Handley |
| 2018/0308329 | A1* | 10/2018 | Lo .......................... G06F 3/048 |
| 2019/0052830 | A1 | 2/2019 | Ruther et al. |
| 2019/0052831 | A1 | 2/2019 | Ruther et al. |
| 2020/0167567 | A1* | 5/2020 | Heo ......................... G06T 7/90 |
| 2020/0205943 | A1* | 7/2020 | Elbaz .................... A61B 1/0638 |
| 2020/0366824 | A1* | 11/2020 | Hofer ................... H04N 23/689 |
| 2021/0033471 | A1 | 4/2021 | Nakamura et al. |
| 2021/0325251 | A1* | 10/2021 | Maeda ................. G06F 3/0485 |
| 2022/0061706 | A1* | 3/2022 | Zade ...................... A61K 38/28 |
| 2022/0094896 | A1* | 3/2022 | Paul ......................... G06T 5/94 |
| 2022/0103022 | A1* | 3/2022 | Bell ....................... G06V 20/52 |

OTHER PUBLICATIONS

Gustavo Pereyra Irujo, "IRimage: open source software for processing images from infrared thermal cameras", https://peerj.com/articles/cs-977/, May 10, 2022.

Fluke TiX580 Infrared Camera, https://www.fluke.com/en-us/product/thermal-cameras/tix580, retrieved Oct. 19, 2022.

"An introduction to tuning a thermal image" Recorded Web Video [online], SparkyNinja, YouTube, Aug. 2, 2021, https://www.youtube.com/watch?v=JJZiefsM-j8&t=799s.

Search report prepared by Great Britain Patent Office in Application No. GB2314117.9 dated Mar. 18, 2024.

* cited by examiner

SYSTEMS, DEVICES, AND METHODS FOR USER SELECTABLE TEMPERATURE SCALE BANDWIDTH FOR THERMOGRAPHY

BACKGROUND

Technicians use a variety of tools to diagnose various items, such as a vehicle, a house, a building, or a component or system on or in one of those items, such as a window or a heating, ventilation, and air conditioning (HVAC) system. In some instances the diagnosis pertains to a temperature of the item. Under those and other circumstances, the technician may use a thermal imager device to capture a thermal image of the item under diagnosis.

Often, a temperature range of the various items may be large, and thus difficult for a technician to obtain an accurate understanding of thermal properties of the various items using a thermal imager device.

OVERVIEW

Several example implementations relate to a thermal imager device that captures and/or displays images including an image captured by a visible light camera, an image captured by a thermal camera, or a blended imaged based on the images captured by the visible light and thermal cameras. In an example embodiment, the thermal imager device is configured to provide a user interface that enables a user to selectively display objects based on a temperature range of interest to the user.

In a first embodiment, a computer-implemented method for displaying thermal images by a thermal imager device is provided. The method includes displaying, by a user interface of a computing device, a plurality of thermal images corresponding to a respective plurality of objects in a scene captured by the thermal imager device. The plurality of thermal images are displayed by a first representation scheme based on a first thermal scale comprising a first range of temperature values corresponding to the plurality of objects. The method includes receiving, by the computing device, a user selection of a subplurality of the plurality of thermal images. And the method includes, responsive to the user selection, displaying, by the user interface, the subplurality of the plurality of thermal images by a second representation scheme based on a second thermal scale comprising a second range of temperature values corresponding to a respective subplurality of the plurality of objects.

In an embodiment, the method includes, responsive to the user selection, displaying, by the user interface, a second subplurality of the plurality of thermal images by a third representation scheme based on the first thermal scale.

In an embodiment, the first thermal scale corresponds to a first temperature bandwidth, and the displaying of the subplurality of the plurality of thermal images by the second representation scheme includes rescaling the first bandwidth to a second bandwidth corresponding to the second thermal scale.

In an embodiment, the second range of temperature values is different from the first range of temperature values.

In an embodiment, the second range of temperature values is a subrange of the first range of temperature values.

In an embodiment, the computing device is the thermal imager device.

In an embodiment, the method includes identifying a second subplurality of objects of the plurality of objects, where the second subplurality of objects comprises objects different from objects in the subplurality of objects. And the method includes, responsive to the user selection, displaying real images of the second subplurality of objects, where the real images are captured by a visible light camera.

In a second embodiment, another computer-implemented method for displaying thermal images by a thermal imager device is provided. The method includes displaying, by a user interface of a computing device, a first plurality of thermal images corresponding to a respective first plurality of objects in a scene captured by the thermal imager device. The first plurality of thermal images are displayed by a first representation scheme based on a first thermal scale comprising a first range of temperature values corresponding to the first plurality of objects. And the method includes displaying, by the user interface, a second plurality of thermal images corresponding to a respective second plurality of objects in the scene captured by the thermal imager device. The second plurality of thermal images are displayed by a second representation scheme based on a second thermal scale comprising a second range of temperature values corresponding to the second plurality of objects. The first range of temperature values is different from the second range of temperature values. The second plurality of thermal images are superimposed over respective real images of the respective second plurality of objects in the scene, where the respective real images are captured by a visible light camera.

In an embodiment, the second plurality of thermal images is a subplurality of the first plurality of thermal images.

In an embodiment, the method includes receiving, by the computing device, a user selection of the second plurality of thermal images.

In an embodiment, the method includes, responsive to the user selection, displaying, by the user interface, a subplurality of the first plurality of thermal images by a third representation scheme based on the first thermal scale. In an embodiment, the third representation scheme is a grayscale colorization scheme.

In an embodiment, the first thermal scale corresponds to a first temperature bandwidth, and the displaying of the subplurality of the plurality of thermal images by the second representation scheme includes rescaling the first bandwidth to a second bandwidth corresponding to the second thermal scale.

In an embodiment, the method includes displaying, by the user interface, respective real images of a third plurality of objects in the scene captured by the visible light camera. The third plurality of objects is associated with a third plurality of thermal images in the scene captured by the thermal imager device. The third plurality of objects is based on a third thermal scale comprising a third range of temperature values corresponding to the third plurality of objects.

In a third embodiment, a thermal imager device is provided. The thermal imager device includes a thermal detector housing comprising a thermal sensor element configured to convert received thermal radiation to a digital signal. The thermal imager device includes a graphical user interface. The thermal imager device includes a controller, which includes one or more processors, and data storage. The data storage has stored thereon computer-executable instructions that, when executed by the one or more processors, cause the controller to perform operations. The operations include receiving, by the thermal detector housing, thermal radiation from a plurality of objects at a scene of interest captured by the thermal imager device. The operations include generating, by the thermal sensor element, the thermal radiation to a digital signal. The operations include displaying, on the graphical user interface and based on the generated digital signal, a plurality of thermal images corresponding to the respective plurality of objects. The plurality of thermal images are displayed by a first representation scheme based on a first thermal scale comprising a first range of temperature values corresponding to the plurality of objects. The operations include receiving, by the graphical user interface, a user selection of a subplurality of the plurality of thermal images. And the operations include, responsive to the user selection, displaying, on the graphical user interface, the subplurality of the plurality of thermal images by a second representation scheme based on a second thermal scale comprising a second range of temperature values corresponding to a respective subplurality of the plurality of objects.

In an embodiment of the thermal imager device, the operations include, responsive to the user selection, displaying, by the user interface, a second subplurality of the plurality of thermal images by a third representation scheme based on the first thermal scale.

In an embodiment of the thermal imager device, the third representation scheme is a grayscale colorization scheme.

In an embodiment of the thermal imager device, the first thermal scale corresponds to a first temperature bandwidth, and the operations for displaying the subplurality of the plurality of thermal images by the second representation scheme include operations to rescaling the first bandwidth to a second bandwidth corresponding to the second thermal scale.

In an embodiment of the thermal imager device, the second range of temperature values is different from the first range of temperature values.

In an embodiment of the thermal imager device, the second range of temperature values is a subrange of the first range of temperature values.

In an embodiment of the thermal imager device, the computing device is the thermal imager device.

In an embodiment of the thermal imager device, the operations include identifying a second subplurality of objects of the plurality of objects, where the second subplurality of objects comprises objects different from objects in the subplurality of objects. And the operations include, responsive to the user selection, displaying real images of the second subplurality of objects, where the real images are captured by a visible light camera.

Other embodiments will become apparent to those of ordinary skill in the art by reading the following detailed description, with reference where appropriate to the accompanying drawings.

BRIEF DESCRIPTION OF THE DRAWINGS

Example embodiments are described herein with reference to the drawings.

The drawings are schematic and not necessarily to scale. In the drawings, similar symbols typically identify similar components, unless context dictates otherwise.

DETAILED DESCRIPTION

Figures 1, 2:
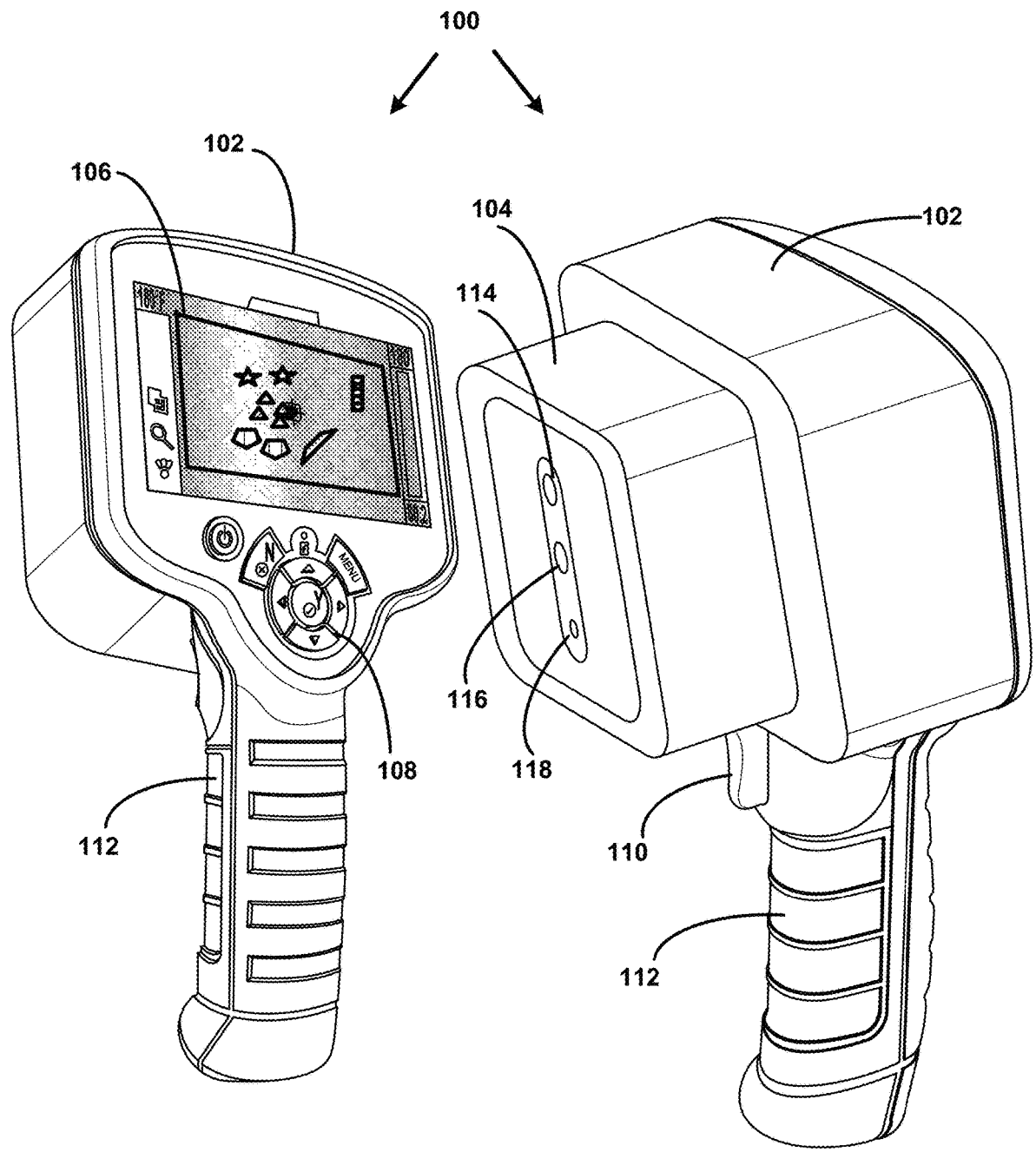
FIG. 1 illustrates a perspective view of a thermal imager device, according to an example embodiment.
FIG. 2 illustrates another perspective view of a thermal imager device, according to an example embodiment.
Figures 3, 4:
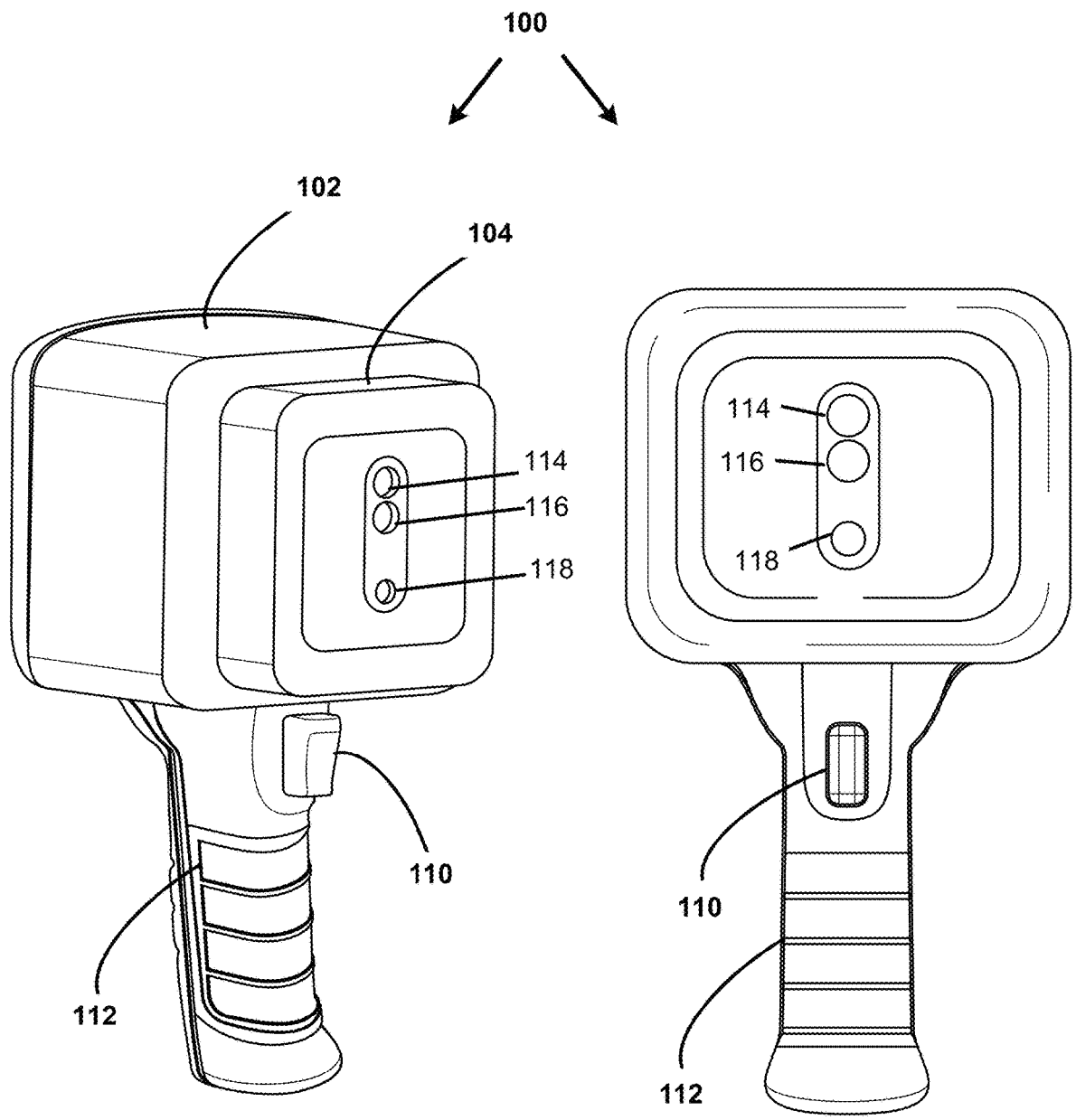
FIG. 3 illustrates another perspective view of a thermal imager device, according to an example embodiment.
FIG. 4 illustrates a plan view of a thermal imager device, according to an example embodiment.
Figure 5:
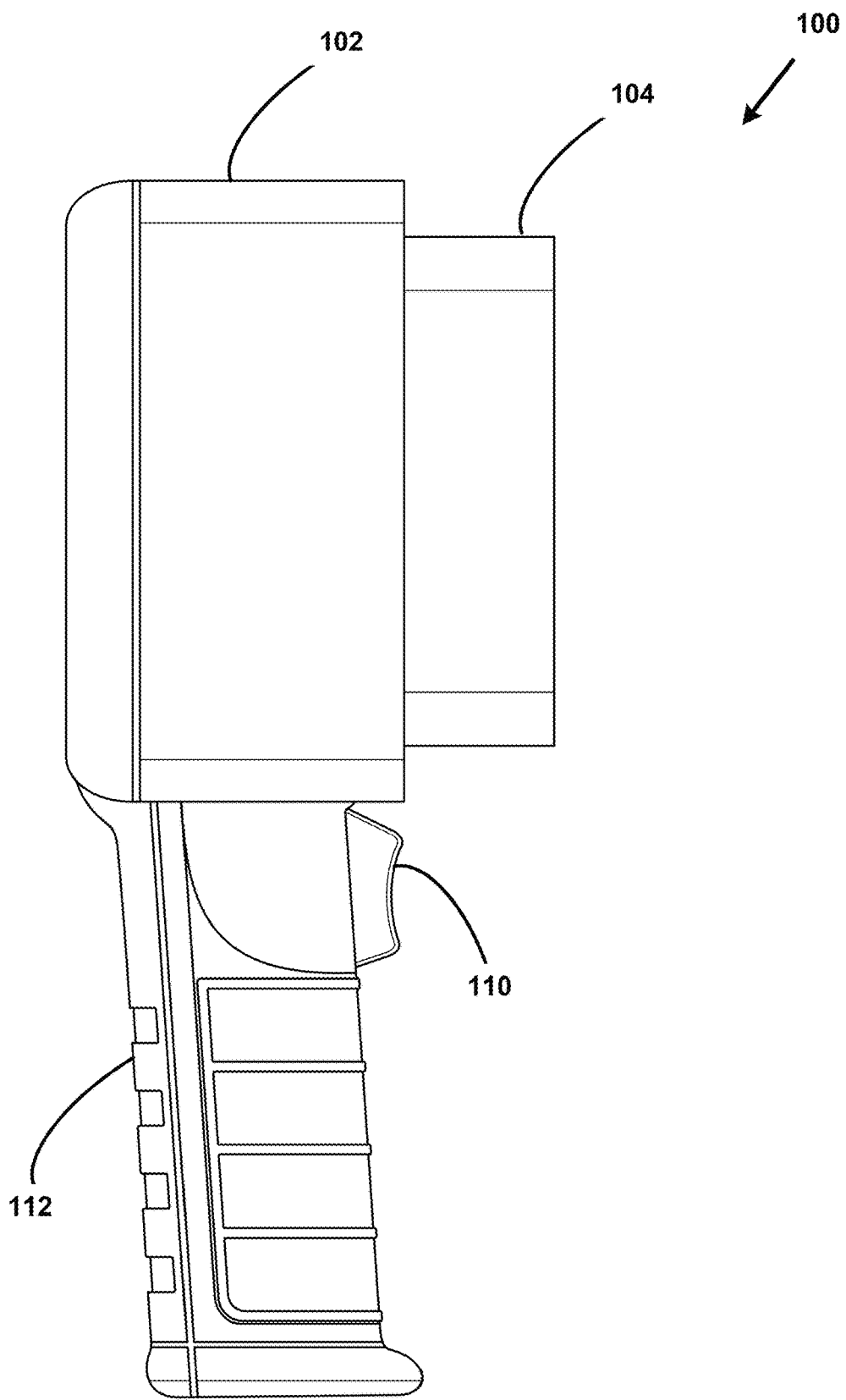
FIG. 5 illustrates a side view of a thermal imager device, according to an example embodiment.

This description describes several example embodiments, at least some which relate to user interfaces on thermal imager devices. In example embodiments, the thermal imager device is configured to provide a user interface that enables a user to selectively display objects based on a temperature range of interest to the user.

The thermal imager device and graphical user interface described herein enables a user to adjust a temperature scale bandwidth for thermal images captured using a thermal imager device. Embodiments described herein relate to a thermal imager device with a user interface (UI) component. The UI component is embodied in a graphical user interface of a device (e.g., of a thermographic camera), that enables the user to adjust a different scaling of the temperature representation of objects in the user interface (e.g., adjust a field of view of the thermographic camera) so that certain objects of interest are bound within the selected scaling. The UI component enables the user to selectively adjust the temperature scale of the displayed images to improve the perception of objects at different temperatures.

In some embodiments, the user can select a certain object visible in the graphical display interface and enter a filtering mode. The computational element of the graphical user interface then adjusts the scaling to a desired setting (e.g., default or user specified). In some embodiments, the desired setting is a pre-determined plus-minus interval about the temperature of the targeted object, for example plus-minus 1° C. about the target object. The computational element of the graphical user interface then adjusts the display to change the scaling such that the representational color of the objects displayed by the graphical display interface is adjusted to the new scaling. For example, the user-selected objects are represented using a color scheme, whereas other objects are represented in an alternate scheme, such as a grayscale, or as visible light images. In this arrangement, it is possible to discern more subtle temperature differences in objects or areas about a certain temperature. Further, the user may select a manual scaling interval about the target object if the desired setting of the scale range interval is not optimal.

FIGS. 1-5 illustrate an example thermal imager device 100, according to an example embodiment. The thermal imager device 100 includes a thermal imager housing 102 and a thermal detector housing 104. In some embodiments, the thermal detector housing 104 includes a thermal detector 114. In some embodiments, the thermal detector housing 104 may be optionally removable.

In example embodiments, the thermal imager housing 102 includes a display (e.g., the graphical user interface 106), the user controls 108, and a handle 112. The handle 112 may additionally include a trigger button 110. A user may hold the thermal imager device 100 using the handle 112 and aim the thermal imager housing 102 at a scene of interest. Radiation from one or more objects in the scene of interest is received by a thermal sensor element of the thermal imager device 100, which converts the received energy into a digital or analog signal. A computational element of the thermal imager device 100 acts on this signal to transform the thermographic information into a thermal image that is displayed by the graphical user interface 106. Further, the thermal imager housing 102 can include a computing device (e.g., the computing system 600 of FIG. 12) housed within the thermal imager housing 102. The computing device includes at least one processor and data storage including program instructions stored thereon that when executed by the at least one processor, cause the thermal imager device 100 to perform one or more of the functions described herein (e.g., described with respect to the ASBNCP 300 of FIG. 7, the method 400 of FIG. 10, and/or the method 500 of FIG. 11). In examples, the processor is communicatively coupled to the thermal detector 114, such that the processor receives data from the thermal detector 114, as described in more detail below.

In example embodiments, the graphical user interface 106 includes a display for displaying content of a communication transmitted by the thermal detector housing 104 and/or a menu that can be navigated using the user controls 108. The graphical user interface 106 can include a capacitive touch screen display, a resistive touch screen display, a plasma display, an LED display, a cathode ray tube display, an OLED display, and/or an LCD. The graphical user interface 106 can include a touch screen display with the LCD. For instance, the graphical user interface 106 can include a capacitive (such as a projective capacitive) touch screen display or a resistive touch screen display. Other examples of the graphical user interface 106 are possible.

The user controls 108 include controls, such as one or more control buttons (or more simply, "buttons" or "keys") that can be used to control operation of the thermal imager device 100. A control button or key can be used to enter a selection or information for the thermal imager device 100. For example, the user controls 108 can be used to select one or more displayed objects, select a portion of the display, enter a temperature value, enter a temperature range, zoom in or zoom out of the display, expand or contract a displayed temperature scaling, and so forth.

As an example, a control button of the user controls 108 can be operatively connected to the processor. In response to use of the control button (e.g., pressing the control button and/or releasing the control button while pressed), the processor can detect a change in an electrical signal input to the processor to detect that the control button is being used or was used, and perform a control function related to the control button at the time the control button is being used or was used. One or more control buttons of the user controls 108 can be used to navigate a menu displayed on the graphical user interface 106.

In an example implementation in which the computing device includes a touch screen display, one or more control functions described as being performed by computing device can be performed by touching the touch screen display while displaying an applicable touch screen display control, or by hovering over an area of the display, by performing gestures, and so forth.

As noted above, the thermal detector housing 104 houses the thermal detector 114. In example embodiments, the thermal detector housing 104 can additionally house a camera 116 and a light 118.

In an example implementation, the camera 116 includes a visible light camera and the thermal detector 114 includes a thermal camera. The thermal camera can be referred to as a "thermal detector." In this implementation, the visible light camera 116 can include a visible sensor array to capture visible light radiation and output a visible light image, and the thermal camera 114 can include a thermal sensor array to capture infrared radiation and output a thermal image. The thermal sensor array can output radiometry to provide a thermal image with measurements.

In an example embodiment, the camera 116 is a visible light camera configured to generate visible light images having a first resolution (e.g., a first number of pixels) and the thermal detector 114 is a thermal camera configured to generate thermal images having a second resolution, different than the first resolution. For instance, the resolution of the camera 116 can be 640 pixels wide×480 pixels high and the resolution of the thermal camera can be 80 pixels wide by 60 pixels high.

The visible light camera 116 can include a sensor array to detect intensities and wavelengths (e.g., 380 nanometers (nm) to 750 nm) of visible light radiation that is visible to a human eye. The visible sensor array of the visible light camera can include a charge-coupled device (CCD) image sensor array, a complementary metal oxide semi-conductor (CMOS) imager sensor array, and/or one or more other optical elements that is/are known in the art.

The thermal detector 114 can include a sensor array to detect intensities and wavelengths of infrared radiation (e.g., 750 nm to 1 millimeter (mm)). As an example, the thermal camera can include a bolometer sensor array (e.g., an uncooled micro-bolometer) or a thermopile infrared sensor array. Additionally or alternatively, the thermal detector 114 can include ferroelectric materials and/or may include a pyroelectric element.

In example embodiments, the thermal detector housing 104 may also house a computing device similar to the computing device of the thermal imager housing 102. Namely, the computing device includes at least one processor and data storage including program instructions stored thereon that when executed by the at least one processor, cause components of the thermal detector housing 104 (e.g., the thermal detector 114, the camera 116, and/or the light 118) to perform one or more of the functions described herein. In examples, the processor housed in the thermal detector housing 104 is communicatively coupled to the processor housed in the thermal imager housing 102, such that the processors transmit and receive data from one another, as described in more detail below.

In example embodiments, the thermal detector housing 104 may house a power source, such as rechargeable and/or removable batteries.

Figure 6:
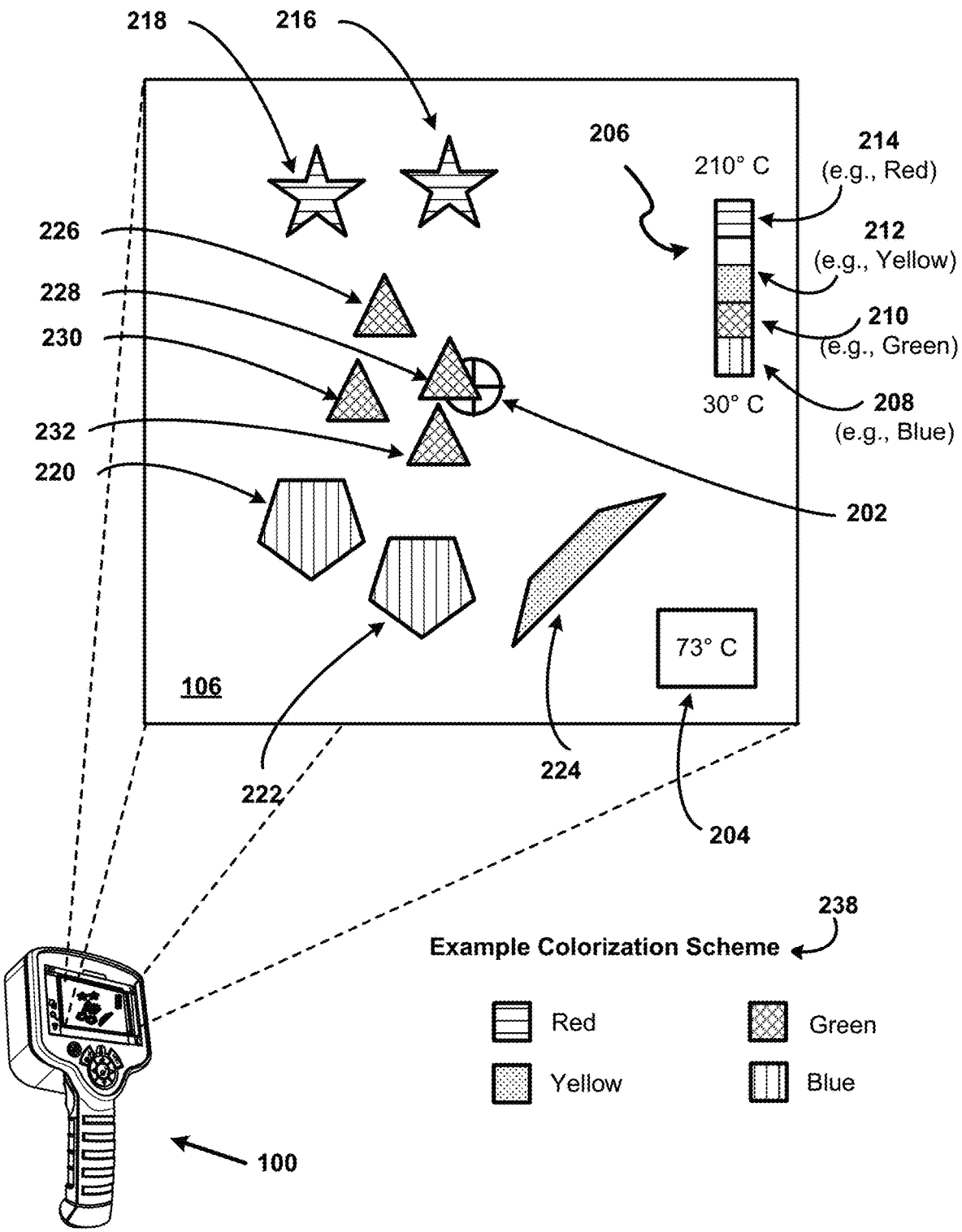
FIG. 6 illustrates example thermographic information displayed by a graphical user interface, according to an example embodiment.

FIG. 6 illustrates example thermographic information displayed by a graphical user interface 106, according to an example embodiment. Although the graphical user interface 106 of FIG. 1 is shown here for purposes of illustration, the graphical user interface may be associated with a device separate from the thermal imager device 100. For example, the thermal imager device 100 may be connected to a network and may transmit data over the network. A separate computing device (e.g., a laptop, a desktop, a handheld device, a smartphone, a wearable device, and so forth) may be connected to the network and may receive the transmitted data from the thermal imager device 100. Upon receiving the transmitted data, the computing device may display corresponding images and/or information on the graphical user interface 106.

Thermal images of a plurality of objects are displayed on the graphical user interface 106, along with a target region 202, and a temperature reading 204 of the target region 202. A user may select the target region 202. In some embodiments, user may input a desired temperature reading 204, and the target region 202 may be automatically selected based on the user input. For example, if the user inputs the desired temperature reading 204 as 73° C., then objects in the graphical user interface 106 corresponding to a thermal temperature at or about 73° C. may be selected as the target region 202. In some embodiments, the target region 202 may represent a portion of the scene that the thermal imager device 100 is aimed at. Also depicted is a temperature scale bar 206, with a range of temperatures between a high temperature (e.g., 210° C.) and a low temperature (e.g., 30° C.), as indicated at the top and bottom of the temperature scale bar 206. In some embodiments, the user may input the high and low temperatures and the temperature scale bar 206 and the graphical user interface 106 may be adjusted responsive to the user input. In some embodiments, the user may directly modify the temperature scale bar 206 (e.g., selecting a portion of the temperature scale bar 206 for magnification), and the graphical user interface 106 may be adjusted responsive to the user input. For example, objects within the range of temperatures specified by the modified temperature scale bar may be displayed. As another example, objects within the range of temperatures specified by the modified temperature scale bar may be displayed using a different representation scheme.

Also, for example, the temperature scale bar 206 comprises a spectrum of colors (e.g., including colors 208, 210, 212, and 214) corresponding to different temperature readings between the high temperature and the low temperature. The plurality of displayed objects are represented using various colors from the spectrum of colors. An example colorization scheme 238 is shown. Accordingly, a temperature of an object may be inferred by referring to the corresponding color as represented by the temperature scale bar 206. In some embodiments, the computational element (e.g., a computing device housed within the thermal imager housing 102) of the thermal imager device 100 can automatically calibrate the temperature scale bar 206 to accommodate a measured temperature range of objects captured in the scene of interest.

For example, images of the objects 216 and 218 are depicted in color 214 (e.g., red) which indicates a temperature closer to the high temperature (e.g., 210° C.) on the temperature scale bar 206. The objects 220 and 222 are depicted in color 208 (e.g., blue) which indicates a temperature closer to the low temperature (e.g., 30° C.) on the temperature scale bar 206. The object 224 is depicted in color 212 (e.g., yellow), indicating a temperature (e.g., approximately 120° C.) somewhere between the low temperature of 30° C. and the high temperature of 210° C. in this illustrative example. The selected or the target region 202 is depicted in color 210 (e.g., green), and is shown to have a temperature of 73° C., as indicated by the temperature reading 204. Also, the objects 226, 228 (e.g., within the target region 202), 230, and 232 are depicted in color 210 (e.g., green) and may be inferred to have the same temperature as the target region 202 (e.g., 73° C., as indicated by the temperature reading 204 in the example). However, the overall range of temperature, from 30° C. to 210° C. is large, and there may be several objects with temperatures in a subrange of temperatures (e.g., 63° C. to 83° C.) that may be of particular interest to a user. As used herein, the term "object" in the context of a display on a user interface generally refers to an image of an object. Accordingly, the terms "object" and "image" may be used interchangeably throughout, and the meaning and/or difference will be apparent from the context. For example, a thermal imager device or a camera captures an image of an object in a scene, and displays the image in the user interface.

As described herein, a system of displaying thermal images may be improved by enabling a user to choose a narrower temperature scaling (e.g., a smaller temperature range) based on a target region of interest.

Figure 7:
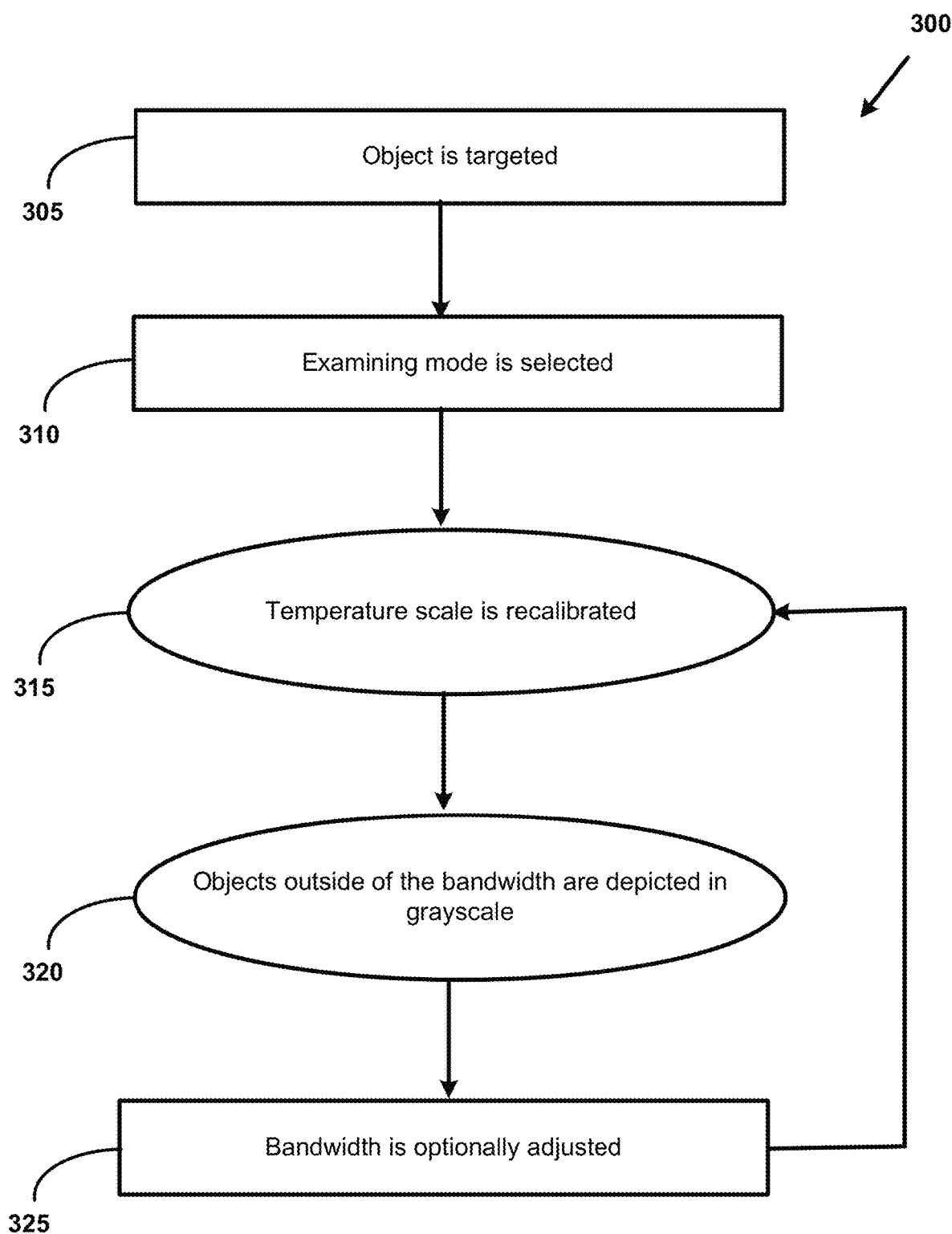
FIG. 7 illustrates another example thermographic information displayed by a graphical user interface, according to an example embodiment.

FIG. 7 illustrates an automatic scale bandwidth narrowing calibration process (ASBNCP) 300, according to an example embodiment. As shown in FIG. 7, the ASBNCP 300 includes one or more operations, functions, or actions as illustrated by blocks 305, 310, 315, 320, and 325. The one or more operations, functions, or actions may be performed by a computing device, such as the thermal imager device 100 of FIGS. 1-5, and/or the computing system 600 of FIG. 12. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

At block 305, the ASBNCP 300 includes an object being targeted (e.g., by a user). For example, the user may select one or more displayed objects for further consideration.

At block 310, the ASBNCP 300 enters an examining mode. For example, the user may select a dedicated button of the plurality of buttons 108 of FIG. 1, or the trigger button 110 of any of FIGS. 2-5, to enter the examining mode.

At block 315, the temperature scale is automatically calibrated (e.g., by the computational element of the thermal imager device 100) to correspond to the temperature range for the one or more objects of interest that are selected at block 305. For example, thermography data may be filtered to adjust the representation of the objects according to settings selectable by the user.

For example, when two objects at different temperature ranges are selected at block 305, the thermography data may be filtered to generate a new temperature scaling. For example, a first selected object may be associated with temperatures in a first range $[T_1, T_2]$. Accordingly, the thermography data may be filtered to adjust the representation of the first object and a first temperature scaling corresponding to the first range $[T_1, T_2]$ may be generated. A user may then select a second object associated with temperatures in a second range $[T_3, T_4]$. Accordingly, the thermography data may be filtered to adjust the representation of the first object and the second object and a new combined temperature scaling may be generated to include the first temperature scaling corresponding to the first range $[T_1, T_2]$ and a second temperature scaling corresponding to the second range $[T_3, T_4]$. In some embodiments, the representation of the first object and the second object may be adjusted and both the first temperature scaling corresponding to the first range $[T_1, T_2]$, and the second temperature scaling corresponding to the second range $[T_3, T_4]$, may be displayed.

At block 320, objects outside of the selected region of interest may be depicted in a different colorization scheme (e.g., in grayscale).

At block 325, the user may choose a different bandwidth (e.g., by selecting a larger or smaller region of interest), and the process returns to block 315, where the temperature scale is automatically recalibrated. For example, if the default temperature bandwidth is not compatible for the object targeted by the user (e.g., the bandwidth is too large or too small for the object), the user may choose a different and/or an optimal bandwidth. The term "bandwidth" as used herein generally refers to a range of temperature values representative of temperature characteristics of the one or more objects of interest.

In some embodiments, the bandwidth may be determined automatically (e.g., by the computational element of the thermal imager device 100). For example, thermography data received by the thermal imager device 100 may indicate that an object of interest has temperature characteristics corresponding to different temperature ranges such as between 30° C. to 35° C., and between 43° C. to 55° C. Accordingly, the bandwidth corresponding to the object of interest may be determined to be 30° C. to 55° C.

In some embodiments, the bandwidth may be automatically determined based on a predetermined range about the temperature range. For example, the thermal imager device 100 may be configured with a bandwidth corresponding to plus or minus 5° C. about the temperature range. Referring to the previous example where the total temperature range for the object of interest is 30° C. to 55° C., the bandwidth may be automatically determined to be 25° C. to 60° C.

In some embodiments, the predetermined range may be a percentage range. For example, the thermal imager device 100 may be configured with a bandwidth to be within 10% of the lowest and highest detected temperatures for the object of interest. Referring to the previous example where the total temperature range for the object of interest is 30° C. to 55° C., the lowest detected temperature is 30° C., and the highest detected temperature is 55° C. Computing 10% of these values yields 3° C. and 5.5° C., respectively. Accordingly, the bandwidth may be automatically determined to be 27° C. to 60.5° C.

In some embodiments, the bandwidth may be hardcoded into the thermal imager device 100, and/or a default bandwidth may be provided by the thermal imager device 100. In some embodiments, the default bandwidth may be configurable by the user (e.g., via a settings menu on the thermal imager device 100). For example, the user may configure the settings of the thermal imager device 100 to change the bandwidth from a default setting of plus or minus 5° C. about the temperature range, to a new setting corresponding to plus or minus 1° C. about the temperature range. As another example, the user may configure the settings of the thermal imager device 100 to change the bandwidth from a default setting of within 10% of the lowest and highest detected temperatures for the object of interest to within 2% of the lowest and highest detected temperatures.

In some embodiments, the user may adjust the bandwidth by adjusting a temperature scale displayed by the thermal imager device 100. For example, the user controls 108 can be used to select one or more displayed objects, select a portion of the display, enter a temperature value, enter a temperature range, enter a desired bandwidth, zoom in or zoom out of the display, expand or contract a displayed temperature scaling, and so forth.

In some embodiments, the thermal imager device 100 may be configured to adjust the bandwidth based on user interaction with the thermal imager device 100. For example, a plurality of objects corresponding to a temperature range of 30° C. to 210° C. may be displayed, with an associated bandwidth of within 2% of the lowest and highest detected temperatures. The user may indicate interest in a subplurality of objects that correspond to a temperature range of 90° C. to 95° C. The user indication may correspond to a user interaction with the displayed plurality of objects corresponding to a temperature range of 30° C. to 210° C. For example, the user may zoom in on a portion of the display that includes the one or more objects, or the user may select the one or more objects. Responsive to the user indication, the thermal imager device 100 may adjust the bandwidth to be within 10% of the lowest and highest detected temperatures. For example, the thermal imager device 100 may be configured to determine that a bandwidth of 2% for a temperature range spanning 180° C. (difference of 210° C. and 30° C.) should be adjusted to a bandwidth of 10% for a temperature range spanning 5° C. (difference of 95° C. and 90° C.).

In some embodiments, the thermal imager device 100 may be configured to rescale the bandwidth based on the scene of interest. For example, the thermal imager device 100 may determine that the thermography data indicates a small temperature difference (e.g., 2° C.) for the displayed objects, and the bandwidth may be rescaled to highlight the small temperature difference. For example, a smaller bandwidth (e.g., 0.1%, 1%, or plus or minus 0.05° C., and so forth) may be used for the small temperature difference. Also, for example, the thermal imager device 100 may determine that the thermography data indicates a large temperature difference (e.g., 250° C.) for the displayed objects, and the bandwidth may be rescaled to highlight the large temperature difference. For example, a larger bandwidth (e.g., 5%, 10%, or plus or minus 10° C., and so forth) may be used for the large temperature difference.

In some embodiments, the thermal imager device 100 may be configured to provide recommended bandwidths to the user. For example, upon user selection of an object of interest, the thermal imager device 100 may indicate a recommended bandwidth for viewing the selected object, and may provide one or more selectable graphical controls to enable the user to select an appropriate bandwidth.

Figure 8:
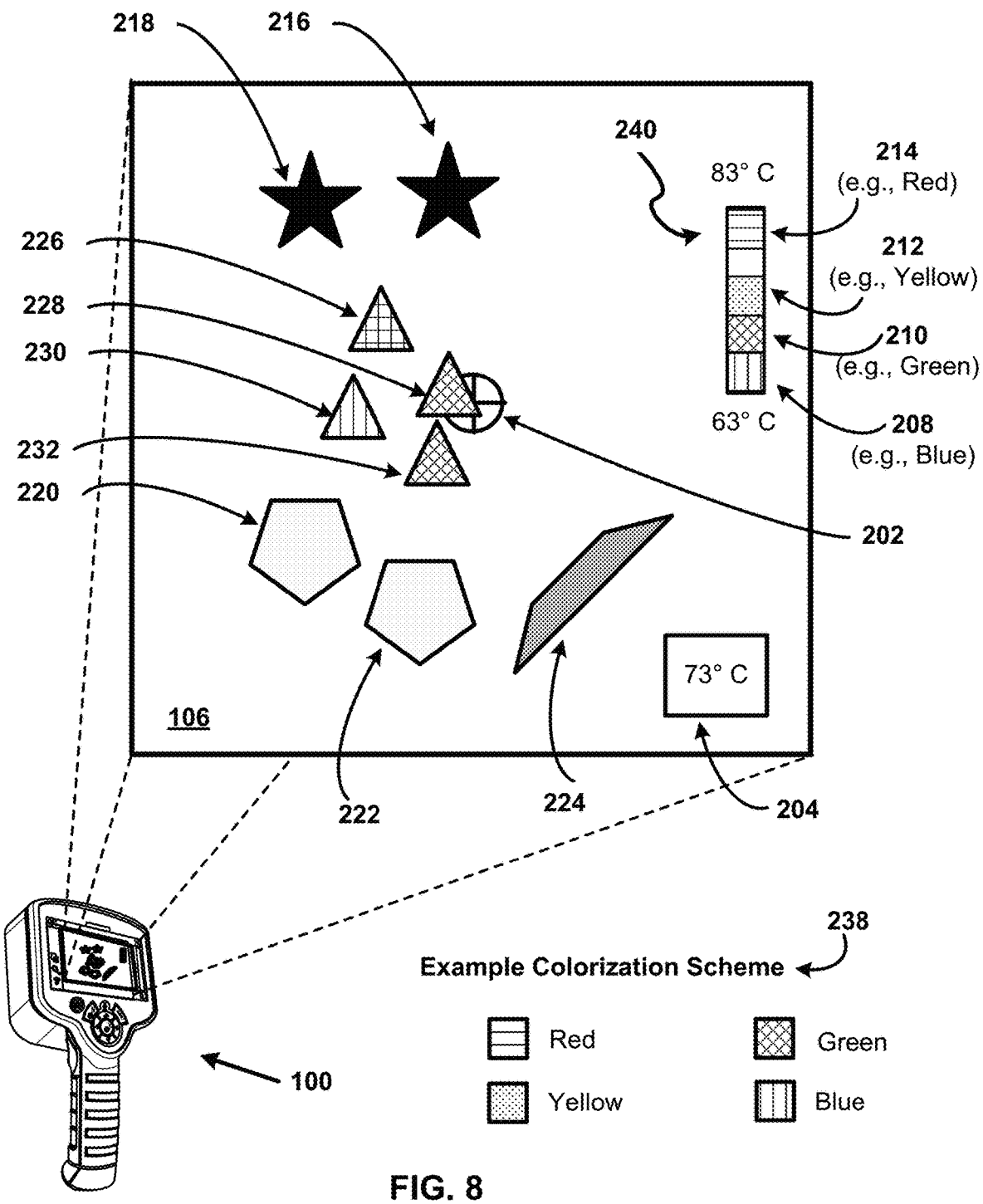
FIG. 8 illustrates example thermographic information based on two temperature scales as displayed by a graphical user interface, according to an example embodiment.

FIG. 8 illustrates another example thermographic information displayed by a graphical user interface 106, according to an example embodiment. In particular, FIG. 8 illustrates an impact of the ASBNCP 300 of FIG. 7 on the graphical user interface 106 of FIG. 6. For example, the temperature scale bar 206 of FIG. 6 has been recalibrated to a recalibrated temperature scale bar 240, which has been adjusted to a smaller range from a recalibrated low temperature of 63° C. to a recalibrated high temperature of 83° C. Although, in some embodiments, the color spectrum for the recalibrated temperature scale bar 240 may be similar to the temperature scale bar 206 of FIG. 6, the colors represent different temperatures (e.g., in the new range of 63° C. to 83° C., instead of the old range of 30° C. to 210° C.). Accordingly, variations in thermal properties of objects with temperatures in the recalibrated range are highlighted for the user. Other colors may be used for the temperature scale bar 240, and there may be no relation between colors of the temperature scale bar 240 and the temperature scale bar 206 of FIG. 6. The colors described herein are for illustrative purposes only.

For example, the color 214 (e.g., red) in the temperature scale bar 240 represents temperatures close to the recalibrated high temperature of 83° C., and the color 208 (e.g., blue) in the temperature scale bar 240 represents temperatures close to the recalibrated low temperature of 63° C. Also, for example, the objects 226, 228, 230, and 232, which were previously depicted by color 210 (e.g., green) in FIG. 6, are now depicted using different colors. For example, although the objects 228 and 232 continue to be depicted in color 210 (e.g., green), the object 226 is now depicted in a different color (e.g., magenta), and the object 230 is now depicted in color 208 (e.g., blue). Also, for example, the objects 216, 218, 220, 222, and 224, fall outside the region of interest, and are depicted in a different colorization scheme. In some embodiments, the colorization scheme may be grayscale, and/or visible light. Generally, any colorization scheme different from the first and second representation schemes may be used as the third representation scheme.

Figure 9:
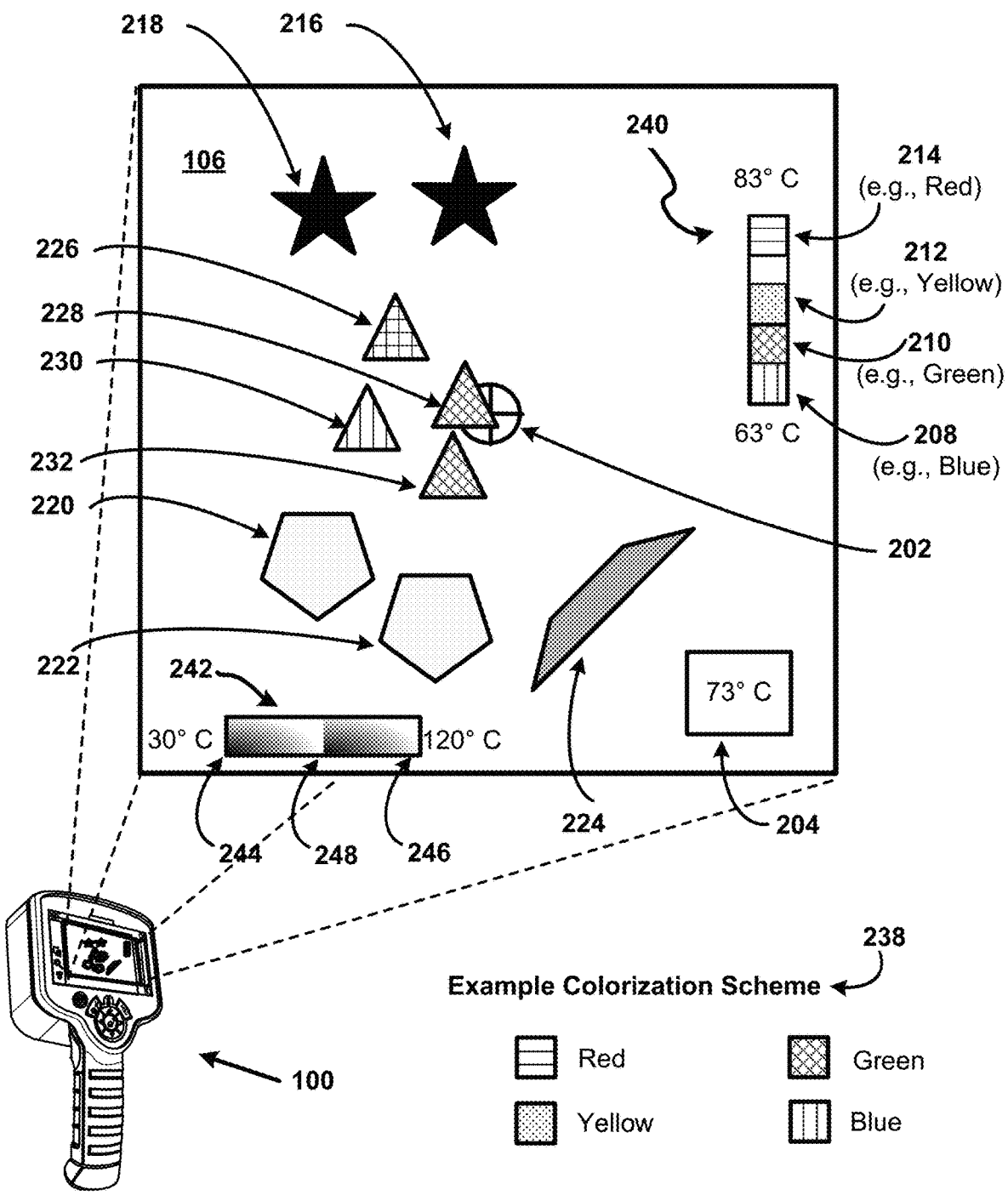
FIG. 9 illustrates an automatic scale bandwidth narrowing calibration process, according to an example embodiment.

FIG. 9 illustrates example thermographic information based on two temperature scales as displayed by a graphical user interface 106, according to an example embodiment. For example, a second temperature scale bar 242 (e.g., corresponding to grayscale as determined at block 320 of FIG. 7) may be displayed, in addition to the recalibrated temperature scale bar 240. For example, the second temperature scale bar 242 may range from a low temperature of 30° C. to a high temperature of 120° C., corresponding to the temperature range of objects that are outside the region of interest (e.g., the objects 216, 218, 220, 222, and 224). The first grayscale 244 may represent a temperature close to the low temperature of 30° C., the second grayscale 246 may represent a temperature close to the high temperature of 120° C., and the third grayscale 248 may represent a temperature close to a middle of the range, such as, for example, a mid-temperature of approximately 75° C. Also, for example, the objects 216, 218, 220, 222, and 224, fall outside the region of interest, and may be depicted in grayscale and/or visible light.

In some embodiments, thermographic data may be overlaid with a visible light image obtained with a visible light camera (e.g., the visible light camera 116). For example, a visible light image of the scene, as captured by a visible light camera, may be displayed. One or more objects in the visible light image may be overlaid (or underlaid) with respective thermographic images. For example, the scene may include an image of a burning house with two adjacent houses also displayed. Accordingly, in some embodiments, the image of the burning house may be overlaid with a thermal image of the burning house, while displaying the visible light images of the adjacent houses. Also, for example, in some embodiments, the thermal image of the burning house may be overlaid with an image of the burning house.

In some embodiments, when the ASBNCP 300 of FIG. 7 is activated, objects with a temperature reading that falls outside the recalibrated temperature scale bar 240 (e.g., the objects 216, 218, 220, 222, and 224) may be displayed as normal objects in the visible light spectrum (not illustrated in FIG. 9), and not assigned a colorization that corresponds to a measured temperature (e.g., in the range 63°-83° C.).

Also, for example, although FIG. 9 illustrates two different temperature scales, additional temperature scales may be provided with respective colorization schemes.

Figure 10:
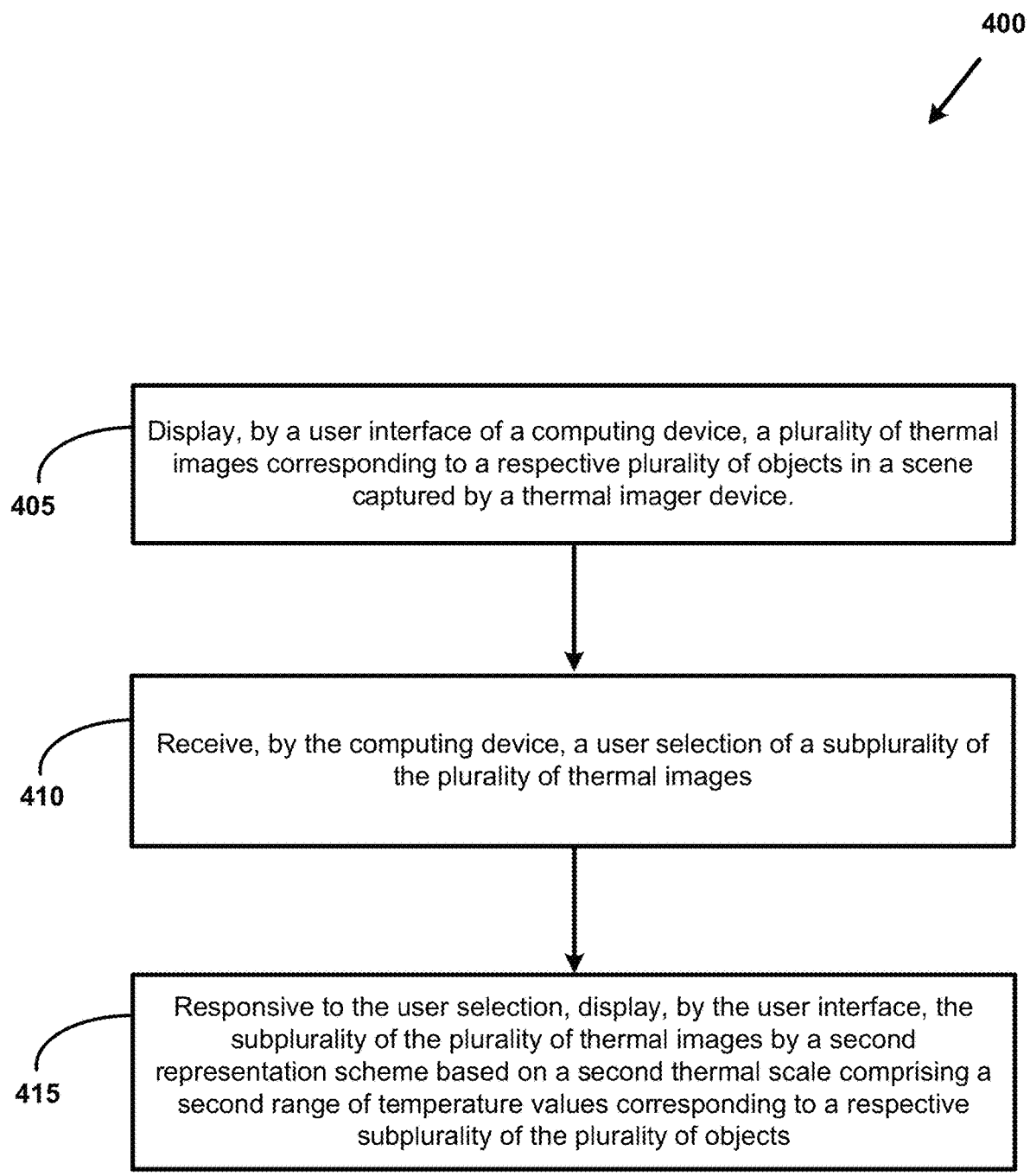
FIG. 10 is a flowchart of a method, according to an example embodiment.

FIG. 10 is a flowchart of a method 400, according to an example embodiment. As shown in FIG. 10, the method 400 includes one or more operations, functions, or actions as illustrated by blocks 405, 410, and 415. The one or more operations, functions, or actions may be performed by a computing device, such as the thermal imager device 100 of FIGS. 1-5, and/or the computing system 600 of FIG. 12. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

At block 405, the method 400 includes displaying, by a user interface (e.g., the graphical user interface 106) of a computing device (e.g., the thermal imager device 100, the computing system 600, and so forth), a plurality of thermal images (e.g., displayed as the objects 216, 218, 220, 222, 224, 226, 228, 230, and 232) corresponding to a respective plurality of objects in a scene captured by the thermal imager device (e.g., the thermal imager device 100), where the plurality of thermal images are displayed by a first representation scheme (e.g., colors corresponding to the temperature scale bar 206) based on a first thermal scale (e.g., the temperature scale bar 206) comprising a first range of temperature values (e.g., 30°-210° C.) corresponding to the plurality of objects. In some embodiments, the representation scheme may include a color scheme, a grayscale, a collection of symbols, a type of shading, and so forth.

At block 410, the method 400 includes receiving, by the computing device, a user selection of a subplurality (e.g., displayed as the objects 226, 228, 230, and 232) of the plurality of thermal images.

At block 415, the method 400 includes, responsive to the user selection, displaying, by the user interface (e.g., the graphical user interface 106), the subplurality (e.g., displayed as the objects 226, 228, 230, and 232) of the plurality of thermal images by a second representation scheme (e.g., colors corresponding to the temperature scale bar 240) based on a second thermal scale (e.g., the temperature scale bar 240) comprising a second range of temperature values (e.g., 63°-83° C.) corresponding to a respective subplurality of the plurality of objects.

In an embodiment, the method 400 includes, responsive to the user selection, displaying, by the user interface (e.g., the graphical user interface 106), a second subplurality (e.g., displayed as the objects 216, 218, 220, 222, and 224) of the plurality of thermal images by a third representation scheme (e.g., another colorization scheme, grayscale, and so forth) based on the first thermal scale (e.g., the temperature scale bar 206).

In an embodiment, the third representation scheme is a grayscale colorization scheme.

In an embodiment, the first thermal scale corresponds to a first temperature bandwidth, and the method 500 includes displaying the subplurality of the plurality of thermal images by the second representation scheme by rescaling the first bandwidth to a second bandwidth corresponding to the second thermal scale.

In an embodiment, the second range of temperature values is different from the first range of temperature values.

In an embodiment, the second range of temperature values is a subrange of the first range of temperature values.

In an embodiment, the computing device is the thermal imager device (e.g., the thermal imager device 100).

In an embodiment, the method 400 includes identifying a second subplurality of objects of the plurality of objects, where the second subplurality of objects comprises objects different from objects in the subplurality of objects. And the method 400 includes, responsive to the user selection, displaying real images of the second subplurality of objects, where the real images are captured by a visible light camera (e.g., the visible light camera 116).

Figure 11:
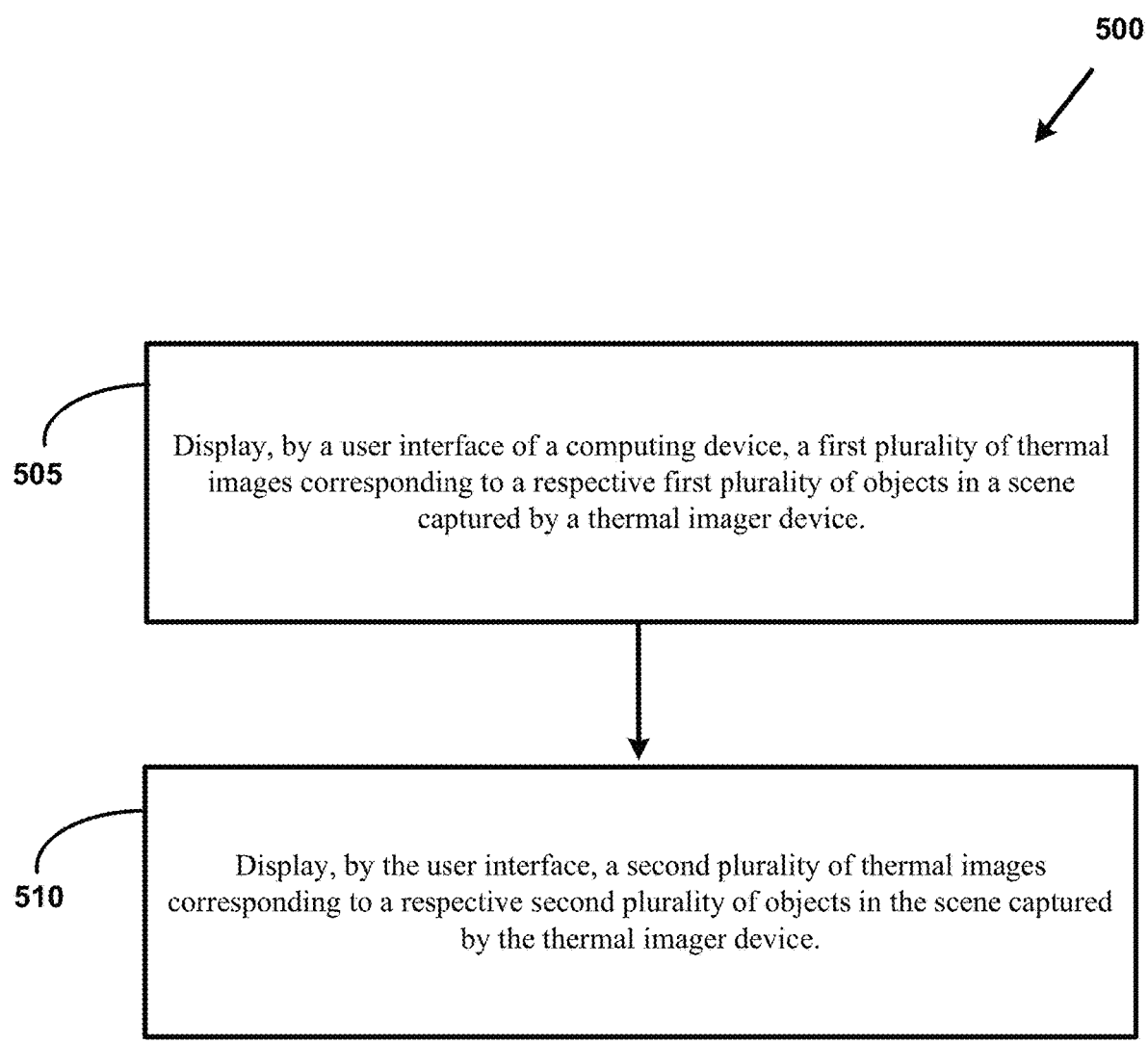
FIG. 11 is another flowchart of a method, according to an example embodiment.

FIG. 11 is another flowchart of a method 500, according to an example embodiment. As shown in FIG. 11, the method 500 includes one or more operations, functions, or actions as illustrated by blocks 505 and 510. The one or more operations, functions, or actions may be performed by a computing device, such as the thermal imager device 100 of FIGS. 1-5, and/or the computing system 600 of FIG. 12. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

At block 505, the method 500 includes displaying, by a user interface (e.g., the graphical user interface 106) of a computing device (e.g., the thermal imager device 100, the computing system 600, and so forth), a first plurality of thermal images (e.g., displayed as the objects 226, 228, 230, and 232) corresponding to a respective first plurality of objects in a scene captured by the thermal imager device (e.g., the thermal imager device 100), where the first plurality of thermal images are displayed by a first representation scheme (e.g., colors corresponding to the temperature scale bar 240) based on a first thermal scale (e.g., the temperature scale bar 240) comprising a first range of temperature values (e.g., 83°-63° C.) corresponding to the first plurality of objects.

At block 510, the method 500 includes displaying, by the user interface (e.g., the graphical user interface 106), a second plurality of thermal images (e.g., displayed as the objects 216, 218, 220, 222, and 224) corresponding to a respective second plurality of objects in the scene captured by the thermal imager device (e.g., the thermal imager device 100), where the second plurality of thermal images are displayed by a second representation scheme (e.g., grayscale colors corresponding to the temperature scale bar 242) based on a second thermal scale (e.g., the temperature scale bar 240) comprising a second range of temperature values (e.g., 30°-120° C.) corresponding to the second plurality of objects. The first range of temperature values is different from the second range of temperature values. The second plurality of thermal images are superimposed over respective real images of the respective second plurality of objects in the scene (not illustrated in FIG. 9), where the respective real images are captured by a visible light camera (e.g., the visible light camera 116).

In an embodiment, the second plurality of thermal images is a subplurality of the first plurality of thermal images.

In an embodiment, the method 500 includes receiving, by the computing device, a user selection of the second plurality of thermal images.

In an embodiment, the method 500 includes, responsive to the user selection, displaying, by the user interface (e.g., the graphical user interface 106), a subplurality of the first plurality of thermal images by a third representation scheme based on the first thermal scale. In an embodiment, the third representation scheme is a grayscale colorization scheme.

In an embodiment, the first thermal scale corresponds to a first temperature bandwidth, and the method 500 includes displaying the subplurality of the plurality of thermal images by the second representation scheme by rescaling the first bandwidth to a second bandwidth corresponding to the second thermal scale.

In an embodiment, the method 500 includes displaying, by the user interface (e.g., the graphical user interface 106), respective real images of a third plurality of objects in the scene captured by the visible light camera (e.g., the visible light camera 116). The third plurality of objects is associated with a third plurality of thermal images in the scene captured by the thermal imager device (e.g., the thermal imager device 100). The third plurality of objects is based on a third thermal scale comprising a third range of temperature values corresponding to the third plurality of objects.

Figure 12:
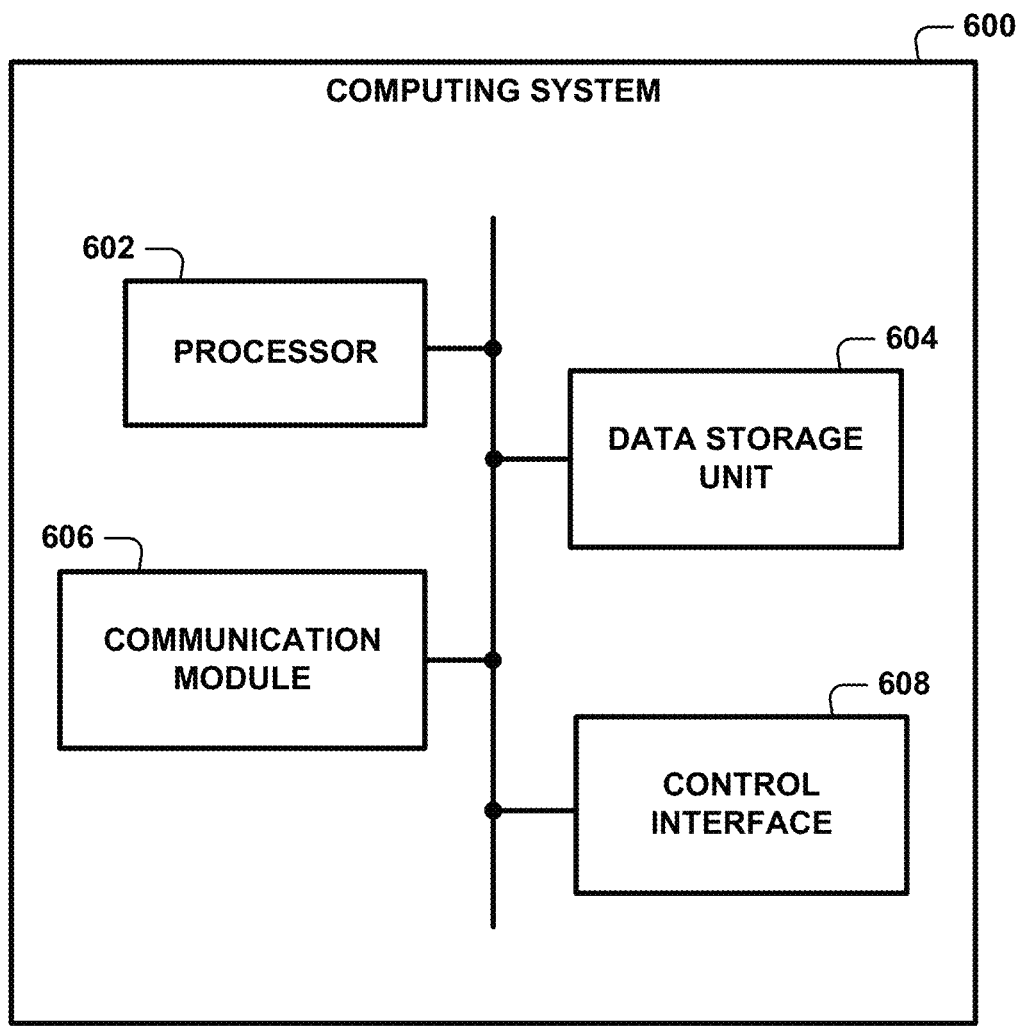
FIG. 12 is a block diagram of a computing system, according to an example embodiment.

FIG. 12 is a block diagram of a computing system 600, according to an example embodiment. The computing system 600 may perform and/or be configured to perform one or more operations. These operations could include those disclosed in this disclosure. The computing system 600 may also include various components. The computing system 600 may include a processor 602, a data storage unit 604, a communication module 606, and a control interface 608. The processor 602 may include one or more general-purpose processors (e.g., microprocessors). Further, the processor 602 may execute program instructions included in the data storage unit 604. For example, processor 602 may execute instructions to perform the operations described with respect to the ASBNCP 300 of FIG. 7, the method 400 of FIG. 10, and/or the method 500 of FIG. 11. In some embodiments, the computing system 600 may be housed within the thermal imager housing 102 of FIGS. 1-3, and 5.

The data storage unit 604 may be or may include one or more volatile, non-volatile, removable, and/or non-removable storage components, which may be integrated in whole or in part with the processor 602. For example, the data storage unit 604 may include magnetic, optical, and/or flash storage. Further, the data storage unit 604 may be or may include a non-transitory computer-readable storage medium, having stored thereon program instructions (e.g., compiled or non-compiled program logic and/or machine code) that, upon execution by the processor 602, cause the computing system 600 and/or another computing system to perform one or more operations, including, for example, the operations described in this disclosure. These program instructions may define and/or be part of a software application. The data storage unit 604 may also store any data as described in this disclosure, among other data.

In some instances, the processor 602 may execute program instructions in response to receiving an input, such as input received via the communication module 606 and/or the control interface 608.

The communication module 606 may allow the computing system 600 to connect with and/or communicate with another entity according to one or more protocols. The computing system 600 may thus send data to and/or receive data from one or more other entities in line with one or more protocols. For example, the communication module 606 may be or may include a wired interface, such as an Ethernet interface. Further, the communication module 606 may include at least one of a Bluetooth antenna, an RF antenna, or a Wi-Fi antenna, which may be able to send and receive data from other antennas, e.g., Bluetooth antennas, RF antennas, and Wi-Fi antennas.

The control interface 608 could allow for user input, including manual overrides. As discussed above, a storage unit could include a lock. Through the control interface 608, a user may manually disable the lock actuator and/or disable the computing system 600.

The computing system 600 may include one or more of the above-described components and may be configured or arranged in various ways. In some examples, the computing system 600 may be configured to operate in line with various other computing systems, e.g., perhaps computing systems of the thermal imager device 100 if the thermal imager device 100 includes computing systems.

It should be understood that the arrangements described herein and/or shown in the drawings are for purposes of example only and are not intended to be limiting. As such, those skilled in the art will appreciate that other arrangements and elements (e.g., machines, interfaces, functions, orders, and/or groupings of functions) can be used instead, and some elements can be omitted altogether.

While various aspects and embodiments are described herein, other aspects and embodiments will be apparent to those skilled in the art. The various aspects and embodiments disclosed herein are for purposes of illustration and are not intended to be limiting, with the true scope being indicated by the claims, along with the full scope of equivalents to which such claims are entitled. It is also to be understood that the terminology used herein for the purpose of describing embodiments only, and is not intended to be limiting.

In this description, the articles "a," "an," and "the" are used to introduce elements and/or functions of the example embodiments. The intent of using those articles is that there is one or more of the introduced elements and/or functions.

In this description, the intent of using the term "and/or" within a list of at least two elements or functions and the intent of using the terms "at least one of," "at least one of the following," "one or more of," "one or more from among," and "one or more of the following" immediately preceding a list of at least two components or functions is to cover each embodiment including a listed component or function independently and each embodiment including a combination of the listed components or functions. For example, an embodiment described as including A, B, and/or C, or at least one of A, B, and C, or at least one of: A, B, and C, or at least one of A, B, or C, or at least one of: A, B, or C, or one or more of A, B, and C, or one or more of: A, B, and C, or one or more of A, B, or C, or one or more of: A, B, or C is intended to cover each of the following possible embodiments: (i) an embodiment including A, but not B and not C, (ii) an embodiment including B, but not A and not C, (iii) an embodiment including C, but not A and not B, (iv) an embodiment including A and B, but not C, (v) an embodiment including A and C, but not B, (v) an embodiment including B and C, but not A, and/or (vi) an embodiment including A, B, and C. For the embodiments including component or function A, the embodiments can include one A or multiple A. For the embodiments including component or function B, the embodiments can include one B or multiple B. For the embodiments including component or function C, the embodiments can include one C or multiple C.

The use of ordinal numbers such as "first," "second," "third" and so on is to distinguish respective elements rather than to denote an order of those elements unless the context of using those terms explicitly indicates otherwise. Further, the description of a "first" element, such as a first plate, does not necessitate the presence of a second or any other element, such as a second plate.

What is claimed is:

1. A computer-implemented method for displaying thermal images by a thermal imager device, comprising:
    displaying, by a user interface of a computing device, a plurality of thermal images corresponding to a respective plurality of objects in a scene captured by the thermal imager device, wherein the plurality of thermal images are displayed by a first representation scheme based on a first thermal scale comprising a first range of temperature values corresponding to the plurality of objects; and
    receiving, by the computing device, a user selection of a subplurality of the plurality of thermal images, wherein the user selection causes the user interface to:
        adjust, based on the selected subplurality of the plurality of thermal images, the first thermal scale to a second thermal scale comprising a second range of temperature values,
        change the first representation scheme for the selected subplurality of the plurality of thermal images to a second representation scheme corresponding to the second thermal scale,
        display the selected subplurality of the plurality of thermal images by the second representation scheme, and
        display a second subplurality of the plurality of thermal images by a third representation scheme based on the first thermal scale.

2. The computer-implemented method of claim 1, wherein the first thermal scale corresponds to a first temperature bandwidth, and the displaying of the subplurality of the plurality of thermal images by the second representation scheme comprises:
    rescaling the first bandwidth to a second bandwidth corresponding to the second thermal scale.

3. The computer-implemented method of claim 1, wherein the second range of temperature values is different from the first range of temperature values.

4. The computer-implemented method of claim 1, wherein the second range of temperature values is a subrange of the first range of temperature values.

5. The computer-implemented method of claim 1, wherein the computing device is the thermal imager device.

6. The computer-implemented method of claim 1, further comprising:
    identifying a second subplurality of objects of the plurality of objects, wherein the second subplurality of objects comprises objects different from objects in the subplurality of objects, and
    wherein the user selection further causes the user interface to display real images of the second subplurality of objects, wherein the real images are captured by a visible light camera.

7. The computer-implemented method of claim 6, wherein thermal images corresponding to the second subplurality of objects are superimposed over the displayed real images of the second subplurality of objects.

8. The computer-implemented method of claim 1, further comprising:
    receiving, by a thermal detector housing of the thermal imager device, thermal radiation from the plurality of objects, wherein thermal detector housing comprises a thermal sensor element configured to convert received thermal radiation to a digital signal; and
    converting, by the thermal sensor element, the received thermal radiation to a digital signal to generate the plurality of thermal images.

9. The computer-implemented method of claim 1, wherein the receiving of the user selection comprises receiving a user input of a target temperature, and wherein the user selection causes the user interface to automatically select the subplurality of the plurality of thermal images that have thermal properties at or about the target temperature.

10. The computer-implemented method of claim 1, further comprising:
    displaying a user adjustable representation of the first thermal scale, and
    wherein the receiving of the user selection comprises receiving a user adjustment of the first thermal scale to the second thermal scale, and wherein the user selection causes the user interface to automatically select the subplurality of the plurality of thermal images that have thermal properties corresponding to the second range of temperature values.

11. A computer-implemented method for displaying thermal images by a thermal imager device, comprising:
displaying, by a user interface of a computing device, a first plurality of thermal images corresponding to a respective first plurality of objects in a scene captured by the thermal imager device, wherein the first plurality of thermal images are displayed by a first representation scheme based on a first thermal scale comprising a first range of temperature values corresponding to the first plurality of objects;
displaying, by the user interface, a second plurality of thermal images corresponding to a respective second plurality of objects in the scene captured by the thermal imager device, wherein the second plurality of thermal images are displayed by a second representation scheme based on a second thermal scale comprising a second range of temperature values corresponding to the second plurality of objects,
wherein the first range of temperature values is different from the second range of temperature values, and
wherein the second plurality of thermal images are superimposed over respective real images of the respective second plurality of objects in the scene, wherein the respective real images are captured by a visible light camera;
receiving, by the computing device, a user selection of the second plurality of thermal images; and
responsive to the user selection, displaying, by the user interface, a subplurality of the first plurality of thermal images by a third representation scheme based on the first thermal scale.

12. The computer-implemented method of claim 11, wherein the second plurality of thermal images is a subplurality of the first plurality of thermal images.

13. The computer-implemented method of claim 11, wherein the first thermal scale corresponds to a first temperature bandwidth, and the displaying of the subplurality of the plurality of thermal images by the second representation scheme comprises:
rescaling the first bandwidth to a second bandwidth corresponding to the second thermal scale.

14. The computer-implemented method of claim 11, further comprising:
displaying, by the user interface, respective real images of a third plurality of objects in the scene captured by the visible light camera, wherein the third plurality of objects is associated with a third plurality of thermal images in the scene captured by the thermal imager device, and wherein the third plurality of objects is based on a third thermal scale comprising a third range of temperature values corresponding to the third plurality of objects.

15. A thermal imager device, comprising:
a thermal detector housing comprising a thermal sensor element configured to convert received thermal radiation to a digital signal;
a graphical user interface;
a controller, which comprises one or more processors, and data storage, wherein the data storage has stored thereon computer-executable instructions that, when executed by the one or more processors, cause the controller to perform operations comprising:
receiving, by the thermal detector housing, thermal radiation from a plurality of objects at a scene of interest captured by the thermal imager device;
converting, by the thermal sensor element, the thermal radiation to a digital signal;
displaying, on the graphical user interface and based on the generated digital signal, a plurality of thermal images corresponding to the respective plurality of objects, wherein the plurality of thermal images are displayed by a first representation scheme based on a first thermal scale comprising a first range of temperature values corresponding to the plurality of objects; and
receiving, by the graphical user interface, a user selection of a subplurality of the plurality of thermal images, wherein the user selection causes the graphical user interface to:
adjust, based on the selected subplurality of the plurality of thermal images, the first thermal scale to a second thermal scale comprising a second range of temperature values,
change the first representation scheme for the selected subplurality of the plurality of thermal images to a second representation scheme corresponding to the second thermal scale,
display the selected subplurality of the plurality of thermal images by the second representation scheme, and
display a second subplurality of the plurality of thermal images by a third representation scheme based on the first thermal scale.

16. The thermal imager device of claim 15, the operations further comprising:
identifying a second subplurality of objects of the plurality of objects, wherein the second subplurality of objects comprises objects different from objects in the subplurality of objects, and
wherein the user selection further causes the graphical user interface to display real images of the second subplurality of objects, wherein the real images are captured by a visible light camera.

17. The thermal imager device of claim 16, wherein the first thermal scale corresponds to a first temperature bandwidth, and the operations for displaying the subplurality of the plurality of thermal images by the second representation scheme comprises operations for:
rescaling the first bandwidth to a second bandwidth corresponding to the second thermal scale.

18. The thermal imager device of claim 16, wherein the second range of temperature values is different from the first range of temperature values.

19. The thermal imager device of claim 16, wherein the second range of temperature values is a subrange of the first range of temperature values.

20. The thermal imager device of claim 16, wherein the computing device is the thermal imager device.

* * * * *